（12) United States Patent
Lindner et al.

(10) Patent No.: US 9,347,560 B2
(45) Date of Patent: May 24, 2016

(54) TEMPERATURE REGULATING DEVICE FOR A PRESSURE VESSEL

(75) Inventors: Markus Lindner, Mainz (DE); Ludger Strack, Heldenrod (DE)

(73) Assignee: GM Global Technology Operations LLC, Detroit, MI (US)

(*) Notice: Subject to any disclaimer, the term of this patent is extended or adjusted under 35 U.S.C. 154(b) by 915 days.

(21) Appl. No.: 12/752,469

(22) Filed: Apr. 1, 2010

(65) Prior Publication Data
US 2011/0240655 A1 Oct. 6, 2011

(51) Int. Cl.
| F17C 3/10 | (2006.01) |
| F17C 3/08 | (2006.01) |
| F17C 5/02 | (2006.01) |
| F17C 7/04 | (2006.01) |
| F16J 12/00 | (2006.01) |
| F17C 1/00 | (2006.01) |
| F17C 13/02 | (2006.01) |

(52) U.S. Cl.
CPC . *F16J 12/00* (2013.01); *F17C 1/00* (2013.01); *F17C 13/026* (2013.01); *F17C 2201/0109* (2013.01); *F17C 2201/056* (2013.01); *F17C 2201/058* (2013.01); *F17C 2203/0604* (2013.01); *F17C 2203/0621* (2013.01); *F17C 2203/0663* (2013.01); *F17C 2203/0682* (2013.01); *F17C 2205/0305* (2013.01); *F17C 2209/2154* (2013.01); *F17C 2221/012* (2013.01); *F17C 2223/0123* (2013.01); *F17C 2223/036* (2013.01); *F17C 2227/0323* (2013.01); *F17C 2227/0381* (2013.01); *F17C 2250/0439* (2013.01); *F17C 2250/0631* (2013.01); *F17C 2260/023* (2013.01)

(58) Field of Classification Search
CPC ............. F16J 12/00; F16J 13/00; F17C 3/10; F17C 2205/0305; F17C 2227/0376; F17C 2227/0386; F17C 13/06
USPC ......... 62/45.1, 47.1, 48.1–48.3, 99, 430, 185; 220/586, 588, 589
See application file for complete search history.

(56) References Cited

U.S. PATENT DOCUMENTS

| 3,137,405 A * | 6/1964 | Gorcey .......................... 220/590 |
| 3,930,375 A * | 1/1976 | Hofmann ........................ 62/45.1 |
| 5,226,299 A * | 7/1993 | Moiseev ......................... 62/45.1 |
| 5,613,366 A * | 3/1997 | Schoenman .................... 62/45.1 |
| 6,554,939 B1* | 4/2003 | Murphy .......................... 156/184 |
| 2004/0035120 A1* | 2/2004 | Brunnhofer .................... 62/45.1 |
| 2008/0251520 A1 | 10/2008 | Ota et al. |

FOREIGN PATENT DOCUMENTS

| CN | 101634396 A | 1/2010 |
| CN | 101672423 A | 3/2010 |
| DE | 102004014144 A1 | 11/2004 |
| DE | 102006019993 B3 * | 12/2007 ................ F17C 5/04 |

* cited by examiner

*Primary Examiner* — Frantz Jules
*Assistant Examiner* — Joseph Trpisovsky
(74) *Attorney, Agent, or Firm* — Fraser Clemens Martin & Miller LLC; James D. Miller

(57) ABSTRACT

A pressure vessel is disclosed, the pressure vessel having an outer shell, an inner shell, and a temperature regulating device, the temperature regulating device adapted to regulate the temperature of a fluid stored in the inner shell during operation of the pressure vessel and to minimize curing time during manufacture of the pressure vessel.

20 Claims, 2 Drawing Sheets

TEMPERATURE REGULATING DEVICE FOR A PRESSURE VESSEL

FIELD OF THE INVENTION

The invention relates to a hollow vessel, and more particularly to a hollow pressure vessel having an outer shell, an inner shell, and a temperature regulating device in fluid communication with a fluid source, the temperature regulating device disposed between the outer shell and an interior cavity of the pressure vessel to facilitate temperature control of the shell.

BACKGROUND OF THE INVENTION

Fuel cells have been proposed as a power source for electric vehicles and other applications. In proton exchange membrane (PEM) type fuel cells, hydrogen is supplied as a fuel to an anode of the fuel cell and oxygen is supplied as an oxidant to a cathode of the fuel cell. A plurality of fuel cells is stacked together in fuel cell stacks to form a fuel cell system. The fuel is typically stored in hollow pressure vessels, such as fuel tanks, disposed on an undercarriage of the vehicle.

The pressure vessels are typically multi-layered and include at least an inner shell and an outer shell. The inner shell may be manufactured using a variety of known methods including: machining; roll forming; injection molding; extrusion blow molding; blow molding; rotational molding; and the like. The inner shell is formed utilizing the rotational molding method by disposing at least one boss in a die cavity with a polymer resin, heating the mold while it is rotated causing the resin to melt and coat walls of the die cavity, cooling the die, and removing the molded inner shell. The finished inner shell is fixed to the at least one boss at an end thereof. To form the outer shell, the molded inner shell typically undergoes a filament winding process. After the filament winding process, the outer shell may require a significant amount of curing time prior to an initial pressurization of the pressure vessel.

A curing time of the pressure vessel may be decreased by exposing an exterior surface of the pressure vessel to elevated temperatures. The elevated temperatures during curing may undesirably increase the ductility of the inner shell. Accordingly, the curing temperature may be limited, especially the curing temperature to which the interior cavity is exposed. The curing time also increases a cost of manufacture of the pressure vessel. Some portions of the pressure vessel may require additional winding, resulting in a portion of the outer shell having a greater thickness than a remaining portion. As a result, the curing time for the greater thickness in the portion of the outer shell is increased.

Severe variations in a temperature of the inner shell may limit a transfer rate of fuel to and from the pressure vessel. Accordingly, a control system may regulate the transfer rate to and from the pressure vessel to militate against severe variations in a temperature of the pressure vessel.

The pressure vessel may be considered "full" during the pressurization when the contents of the pressure vessel reach a particular density. As the temperature within the pressure vessel increases during pressurization, the amount of pressure needed for the contents to reach the particular density also increases. Consequently, excessive amounts of energy may be expended to pressurize the pressure vessel until the contents reach the particular density when the temperature within the pressure vessel is increased.

The presence of the outer shell may undesirably increase a refueling time of the pressure vessel. As hydrogen or other fuel is transferred to an interior cavity of the pressure vessel at pressures up to 12,690 psi (875 bar), a temperature within the pressure vessel increases. The outer shell, typically formed from a material that conducts heat poorly, insulates the inner shell. As a result, the transfer rate of fuel to the interior cavity may be limited, increasing the refueling time of the pressure vessel.

The presence of the outer shell may undesirably decrease a transfer rate of fuel from the pressure vessel. As hydrogen or other fuel is rapidly removed from the interior cavity of the pressure vessel, a temperature within the pressure vessel decreases. The outer shell, typically formed from a material that conducts heat poorly, insulates the inner shell. The outer shell militates against the fuel within the pressure vessel from absorbing energy from an ambient environment. As a result, the outer shell may limit the transfer rate of fuel from the interior cavity.

It would be desirable to develop a pressure vessel having an outer shell, an inner shell, and a temperature regulating device, the temperature regulating device adapted to regulate the temperature of the inner shell during operation of the pressure vessel and to decrease curing time during manufacture of the pressure vessel.

SUMMARY OF THE INVENTION

Presently provided by the invention, a pressure vessel having an outer shell, an inner shell, and a temperature regulating device, the temperature regulating device adapted to regulate the temperature of the inner shell, has surprisingly been discovered.

In one embodiment, the vessel comprises a hollow inner shell adapted to store a fluid, an outer shell formed around the hollow inner shell, a temperature regulating device at least one of disposed between the hollow inner shell and the outer shell, disposed in the hollow inner shell, and disposed in the outer shell, and a boss including a fluid conduit formed therein disposed on the inner shell and forming a substantially fluid tight seal therebetween, the fluid conduit and the temperature regulating device are in fluid communication with a temperature control system.

In another embodiment, the vessel comprises a hollow inner shell adapted to store a fluid, an outer shell formed around the hollow inner shell, a temperature regulating device at least one of disposed between the hollow inner shell and the outer shell and disposed in the hollow inner shell, a boss including a fluid conduit formed therein disposed on the hollow inner shell and forming a substantially fluid tight seal therebetween, and a temperature control system in electrical communication with at least one temperature sensor, the temperature regulating device, the fluid conduit, and the temperature control system forming a closed loop system.

In another embodiment, the vessel comprises a hollow inner shell adapted to store a fluid, a filament wound outer shell formed around the hollow inner shell, a porous layer disposed between the hollow inner shell and the outer shell, a boss including a fluid conduit formed therein disposed on the hollow inner shell and forming a substantially fluid tight seal therebetween, and a temperature control system in electrical communication with at least one temperature sensor, the porous layer, the fluid conduit, and the temperature control system forming a closed loop system.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
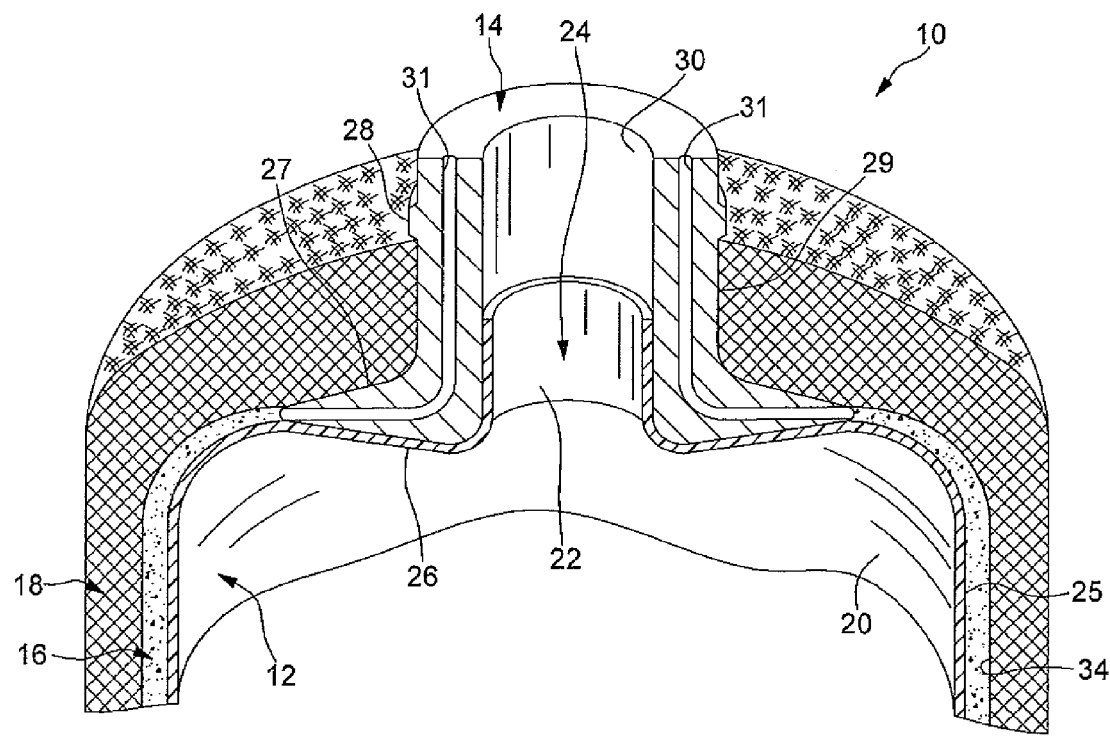
FIG. 1 is a fragmentary perspective view of a pressure vessel including a temperature regulating device according to an embodiment of the present invention, a portion of the pressure vessel shown in section.
Figure 2:
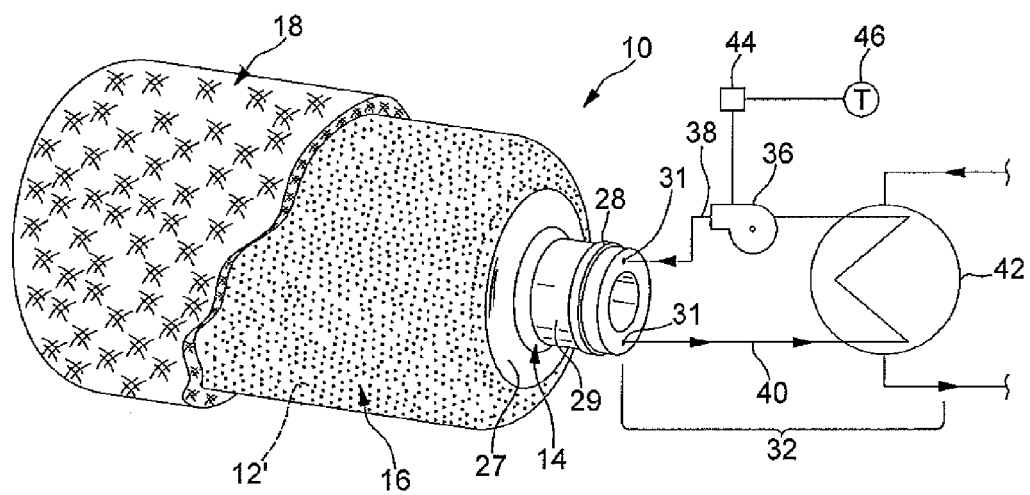
FIG. 2 is a perspective view of the pressure vessel illustrated in FIG. 1, an outer shell of the pressure vessel shown in fragment, and a schematic flow diagram of a temperature control system in communication with the pressure vessel.

FIGS. 1 and 2 illustrate a hollow pressure vessel 10 having a hollow inner shell 12, a boss 14, a porous layer 16, and an outer shell 18. The vessel 10 has a substantially cylindrical shape and is adapted to hold a pressurized fluid (not shown). It is understood that the vessel 10 may have any shape as desired. The pressurized fluid may be any fluid such as a gas, a liquid, and both a liquid and a gas, for example.

The inner shell 12 of the vessel 10 is a hollow container adapted to store the pressurized fluid. The inner shell 12 is typically formed from a polymeric material. However, any other formable material may be used. The inner shell 12 is substantially "capsule" shaped, including a hollow right circular cylinder as a central portion and two hollow hemispheres disposed at opposing ends thereof. Other shapes of the inner shell 12 may be used such as a prolate spheroid, other ellipsoids, or other shapes. An inner surface 20 of the inner shell 12 defines an interior volume of the vessel 10. The inner shell 12 is formed from one of injection molding, rotational molding, blow molding, stretch injection molding, thermoforming, or any other suitable process. The inner shell 12 includes a hollow neck portion 22 which forms a vessel opening 24. As shown, the hollow neck portion 22 is a hollow right circular cylinder, but other shapes may be used.

The boss 14 is disposed on a portion of an outer surface 25 of the inner shell 12 at a first end 26 thereof. The boss 14 is a separately produced finish that encloses the hollow neck portion 22. The boss 14 is typically shaped to accommodate a specific closure and includes a flanged portion 27 abutting the hollow inner shell 12. The vessel 10 may include a single boss or a plurality of bosses, as desired. The boss 14 includes an annular protuberance 28 formed on an outer surface 29 thereof. The protuberance 28 is adapted to abut the outer shell 18, securing the boss 14 in relation to the vessel 10. The outer surface 29 or an inner surface 30 of the boss 14 may be threaded to receive a portion of a hose, nozzle, conduit, or other means for fluid communication (not shown). It is also understood that the boss 14 may be formed from any conventional material such as a plastic, a steel, a steel alloy, or aluminum, for example. The boss 14 includes a fluid conduit 31 formed therein. The fluid conduit 31 facilitates fluid communication between a finish end and the flanged portion 27 of the boss 14. The vessel 10 may include two fluid conduits 31 as shown, or more or fewer fluid conduits 31, as desired. The boss 14 may also be a blind boss adapted to anchor the vessel 10 to another structure or pressure relief devices, as desired.

The porous layer 16 is disposed on at least a portion of the outer surface 25 of the inner shell 12 to form the temperature regulating device. At the first end 26 of the inner shell 12, the porous layer 16 abuts the flanged portion 27 of the boss 14 and is in fluid communication with a temperature control system 32, illustrated in FIG. 2, via the fluid conduits 31. Any conventional non-corrosive material including pores formed therein such as a glass fiber mat, a sintered metal, a bonded metal mesh, a woven cloth, and a porous foam, for example, may be used to form the porous layer 16. Any other substantially crush proof, porous material may also be used. The porous layer 16 may include a fluid barrier formed therein. The fluid barrier may be formed in the porous layer 16 by heat pressing a portion of the porous layer 16 or by impregnating the porous layer 16 with a material that is substantially impermeable when cured. Alternately, when the porous layer 16 is disposed on the portion of the outer surface 25, the fluid barrier may be formed by contact between the inner shell 12 and the outer shell 18.

The outer shell 18 of the vessel 10 is disposed on the porous layer 16 and the inner shell 12. As shown, an inner surface 34 of the outer shell 18 substantially abuts the porous layer 16. The outer shell 18 is joined to the boss 14 at the first end 26 of the vessel 10. The outer shell 18 may be formed using a filament winding process. If the outer shell 18 is formed using the filament winding process, the outer shell 18 may be formed from a carbon fiber, a glass fiber, a composite fiber, and a fiber having a resin coating, as desired. The outer shell 18 may also be formed from any moldable material such as a metal and a plastic, for example. It is understood that the material used to form the outer shell 18 may be selected based on the process used to affix the outer shell 18 to the inner shell 12, the use of the vessel 10, and the properties of the fluid to be stored in the vessel 10.

The temperature control system 32 manages a flow of a fluid to and from the porous layer 16. The porous layer 16 is in fluid communication with the temperature control system 32 and forms a closed loop system containing the fluid. The temperature control system 32 includes a pump 36, a supply conduit 38, an exhaust conduit 40, and a heat exchanger 42. In the embodiment shown, the temperature control system 32 is disposed adjacent the vessel 10, but any location may be used. As non-limiting examples, the temperature control system 32 may be disposed on an undercarriage of a vehicle into which the vessel 10 is incorporated, an interior compartment of the vehicle, or on the outer shell 18 of the vessel 10. Alternately, the temperature control system 32 may be disposed in a fueling device.

The pump 36 is a fluid transfer pump as is known in the art, wherein the pump 36 transfers the fluid through the closed loop system. As shown, the pump 36 is disposed in the supply conduit 38, but the pump 36 may be disposed at any location in fluid communication with the closed loop system. The pump 36 is in electrical communication with a controller 44, the controller 44 typically receiving information from at least one temperature sensor 46 or other sensor type. The at least one temperature sensor 46 may be disposed on the vessel 10 to measure a temperature thereof or the vehicle to measure an ambient temperature.

The supply conduit 38 and the exhaust conduit 40 are fluid conduits as are known in the art. The supply conduit 38 facilitates fluid communication between the heat exchanger 42 and the porous layer 16. The exhaust conduit 40 facilitates fluid communication between the porous layer 16 and the heat exchanger 42.

The heat exchanger 42 is a heat exchanger as is known in the art. As shown, the heat exchanger 42 is a liquid to liquid heat exchanger, including a first conduit and a second conduit, the conduits separated by a conductive barrier, but any type of heat exchanger may be used. The first conduit is in fluid communication with the supply conduit 38 and the exhaust conduit 40. The second conduit is in fluid communication with an external fluid source.

Figure 3:
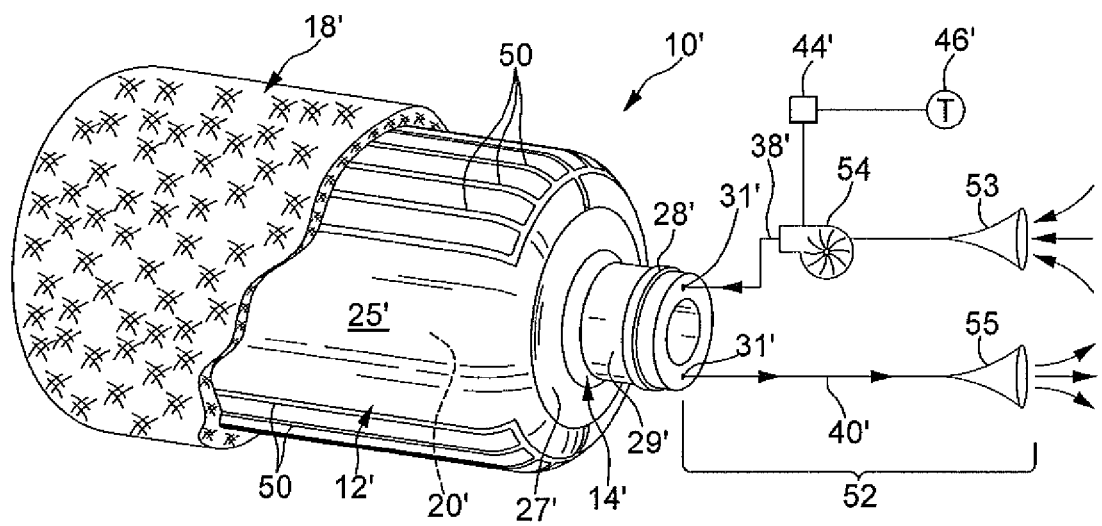
FIG. 3 is a perspective view of a pressure vessel according to another embodiment of the invention, an outer shell of the pressure vessel shown in fragment, and a schematic flow diagram of a temperature control system in communication with the pressure vessel.

FIG. 3 shows another embodiment of the invention similar to that shown in FIGS. 1 and 2. Reference numerals for similar structure in respect of the description of FIGS. 1 and 2 are repeated in FIG. 3 with a prime (') symbol.

The vessel 10' includes the temperature regulating device integrally formed with the inner shell 12', between the inner surface 20' and the outer surface 25' of the inner shell 12'. The temperature regulating device is a plurality of channels 50 formed in the outer surface 25' of the inner shell 12'. The plurality of channels 50 is formed on a first side of the inner shell 12', the plurality of channels 50 running along a length of the inner shell 12' before continuing along the length of the inner shell 12' on a second side of the inner shell 12'. The plurality of channels 50 may be formed in the inner shell 12' by a mold pattern corresponding to the plurality of channels 50 during manufacture of the inner shell 12' or by a secondary process that removes a portion of the inner shell 12' corresponding to the plurality of channels 50 after the inner shell 12' is formed. Each of the channels forming the plurality of channels 50 may have a rectangular cross-section, a triangular cross-section, a semi-circular cross-section, or other cross-section. The plurality of channels 50 is in fluid communication with the fluid conduits 31'. The plurality of channels 50 form manifold areas adjacent the fluid conduits 31' to facilitate fluid communication therebetween. Alternately, the temperature regulating device integrally formed with the inner shell 12' may be a plurality of protuberances formed on the inner shell 12'. The inner shell 12' may include a fluid barrier integrally formed therewith. A land or a plurality of lands is formed on the inner shell 12' between each of the channels forming the plurality of channels 50, each of the lands in contact with the outer shell 18' may form the fluid barrier.

The temperature control system 52 manages a flow of a fluid to and from the plurality of channels 50. The temperature control system 52 is in fluid communication with an ambient environment. The plurality of channels 50 in fluid communication with the temperature control system 52 forms an open loop system. The temperature control system 60 includes an inlet 53, a blower 54, a supply conduit 38', an exhaust conduit 40', and an outlet 55. The temperature control system 52 is disposed adjacent the vessel 10', but any location may be used. As non-limiting examples, the temperature control system 52 may be disposed on an undercarriage of a vehicle into which the vessel 10' is incorporated, an interior compartment of the vehicle, or on the outer shell 18' of the vessel 10'. Alternately, the temperature control system 52 may be disposed in a fueling device.

The inlet 53 and the outlet 54 respectively facilitate fluid communication between the ambient environment and the supply conduit 38' and the exhaust conduit 40'. Typically, the inlet 53 and the outlet 54 are spaced apart. The inlet 53 may be a ram air inlet. The inlet 53 and the outlet 54 may be a finish of the supply conduit 38' and the exhaust conduit 40', a hollow body having apertures formed therein, or other structure as desired. The inlet 53 may include an air filter disposed therein (not shown).

The blower 54 is a fan as is known in the art, wherein the blower 54 transfers air through the open loop system. As shown, the blower 54 is disposed in the supply conduit 38', but the blower 54 may be disposed at any location in fluid communication with the open loop system. The blower 54 is in electrical communication with a controller 44', the controller 44' receiving information from at least one temperature sensor 46' or other sensor type. The temperature sensor 46' may be disposed on the vessel 10' to measure a temperature thereof or the vehicle to measure an ambient temperature.

The supply conduit 38' and the exhaust conduit 40' are fluid conduits as are known in the art. The supply conduit 38' facilitates fluid communication between the inlet 53 and the plurality of channels 50. The exhaust conduit 40' facilitates fluid communication between the plurality of channels 50 and the outlet 55.

Figure 4:
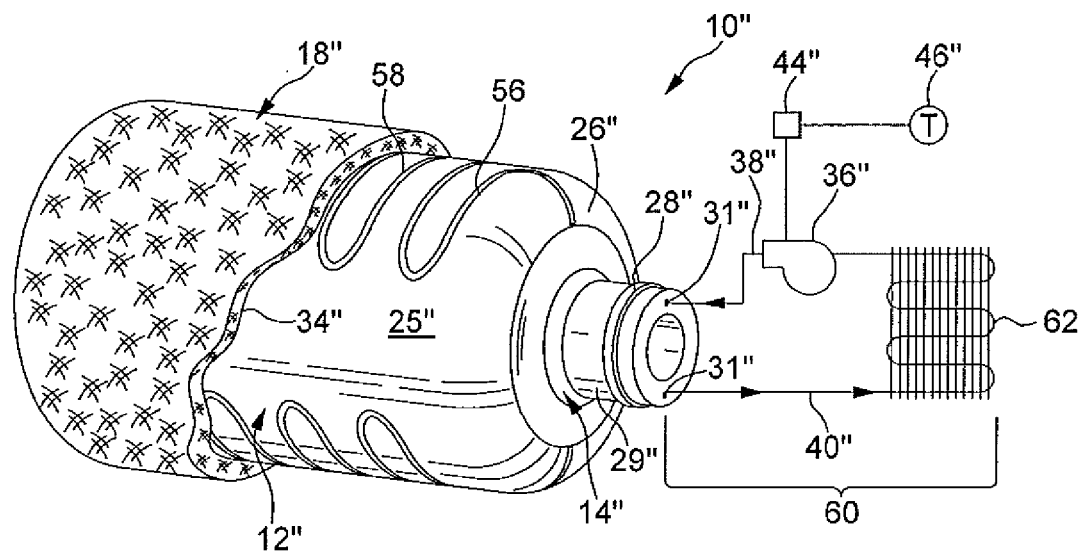
FIG. 4 is a perspective view of a pressure vessel according to another embodiment of the invention, an outer shell of the pressure vessel shown in fragment, and a schematic flow diagram of a temperature control system in communication with the pressure vessel.

FIG. 4 shows another embodiment of the invention similar to that shown in FIGS. 1 and 2. Reference numerals for similar structure in respect of the description of FIGS. 1 and 2 are repeated in FIG. 3 with a double prime (") symbol.

The vessel 10" includes the temperature regulating device disposed in a channel between the inner surface 20" and the outer surface 25" of the inner shell 12". The temperature regulating device is a conduit 56. As shown, the conduit 56 is disposed in a conduit channel 58 formed in the outer surface 25" in a meandering pattern along a first side of the inner shell 12", extending along the length of the vessel before returning to the first end 26" in a similar manner on a second side of the inner shell 12", but any other pattern such as a spiral pattern or a channel formed in a single side of the inner shell 12" may be used. The conduit 56 is formed to substantially correspond to the conduit channel 58. Further, a plurality of channels may be used. The conduit 56 may be formed from a metal, a polymer, or any other crush proof and corrosion resistant material. The conduit 56 is in fluid communication with the fluid conduits 31". The conduit 56 may include manifolds (not shown) disposed in a plurality of conduit channels 58 to facilitate fluid communication between a plurality of conduits and the fluid conduits 31". The conduit 56 may also be integrated into the inner shell 12", the outer shell 18", or both the inner shell 12" and the outer shell 18".

The temperature control system 60 manages a flow of a fluid to and from the conduit 56. The conduit 56 in fluid communication with the temperature control system 60 forms a closed loop system containing the fluid. The temperature control system 60 includes a pump 36", a supply conduit 38", an exhaust conduit 40", and a passive heat exchanger 62. The temperature control system 60 is disposed adjacent the vessel 10", but any location may be used. As non-limiting examples, the temperature control system 60 may be disposed on an undercarriage of a vehicle into which the vessel 10" is incorporated, an interior compartment of the vehicle, or on the outer shell 18" of the vessel 10". Alternately, the temperature control system 60 may be disposed in a fueling device.

The pump 36" is a fluid transfer pump as is known in the art, wherein the pump 36" transfers the fluid through the closed loop system. As shown, the pump 36" is disposed in the supply conduit 38", but the pump 36" may be disposed at any location in fluid communication with the closed loop system. The pump 36" is in electrical communication with a controller 44", the controller 44" receiving information from at least one temperature sensor 46" or other sensor type. The temperature sensor 46" may be disposed on the vessel 10" to measure a temperature thereof or the vehicle to measure an ambient temperature.

The supply conduit 38" and the exhaust conduit 40" are fluid conduits as are known in the art. The supply conduit 38" facilitates fluid communication between the passive heat exchanger 62 and the conduit 56. The exhaust conduit 40" facilitates fluid communication between the conduit 56 and the passive heat exchanger 62.

The passive heat exchanger 62 is a heat exchanger as is known in the art. As shown, the passive heat exchanger 62 is a liquid to air heat exchanger, including a primary conduit passing in an undulating manner through a plurality of conductive sheets, but any type of heat exchanger may be used. The primary conduit is in fluid communication with the supply conduit 38" and the exhaust conduit 40".

In use, the vessels 10, 10', 10" respectively including one of the porous layer 16, the plurality of channels 50, and the conduit 56 may be used to regulate the temperature of the inner shell 12, 12', 12" during operation of the pressure vessel 10, 10', 10" and to decrease curing time during manufacture of the pressure vessel 10, 10', 10".

During initial pressurization and refilling of the vessel 10, 10', 10", the temperature regulating device and the temperature control system 32, 52, 60 cooperate to reduce a temperature of the inner shell 12, 12', 12". Upon detection of a rise in temperature of the vessel 10, 10', 10" by the temperature sensor 46, 46', 46", the pump 36, 36" or blower 54 is activated.

The fluid in the temperature control system 32 and the porous layer 16 is circulated by the pump 36. The fluid entering the porous layer 16 through the fluid conduit 31 in fluid communication with the supply conduit 38 disperses through the pores of the porous layer 16, ultimately leaving the porous layer 16 through the fluid conduit 31 in fluid communication with the exhaust conduit 40. The fluid may be directed towards the fluid conduit 31 in fluid communication with the exhaust conduit 40 by the fluid barriers formed therein. As the vessel 10 has an elevated temperature during pressurization, the fluid leaving the vessel 10 in the exhaust conduit 40 has a higher temperature than the fluid entering the vessel 10 in the supply conduit 38. After entering the heat exchanger 42, heat in the fluid is transferred to the second conduit and removed from the temperature control system 32. The second conduit may be a portion of a vehicle cooling system, a refrigeration system, or a fluid reservoir, for example. The fluid exits the heat exchanger 42 at a lower temperature and is recirculated by the pump 36. It should be noted that the vessel 10 including the porous layer 16 may also be used with the temperature control system 52, 60. The temperature control system 32, 52, 60 may also be used to heat the vessel 10 in a similar manner.

The fluid employed in the temperature control system 52 and the plurality of channels 50 is forced through the open loop system by the blower 52. The fluid entering the plurality of channels through the fluid conduit 31' in fluid communication with the supply conduit 38' flows through each of the channels on the first side of the inner shell 12', ultimately leaving the plurality of channels 50 on the second side of the inner shell 12' through the fluid conduit 31' in fluid communication with the exhaust conduit 40'. As the vessel 10' has an elevated temperature during pressurization, the fluid leaving the vessel 10' in the exhaust conduit 40' and the outlet 55 has a higher temperature than the fluid entering the vessel 10' in the supply conduit 38' and the inlet 53. After exiting the outlet 55, heat in the fluid is transferred to the ambient environment and removed from the temperature control system 52. It should be noted that the vessel 10' including the plurality of channels 50 may also be used with the temperature control system 32, 60. The temperature control system 32, 52, 60 may also be used to heat the vessel 10' in a similar manner.

The fluid in the temperature control system 60 and the conduit 56 is circulated by the pump 36". The fluid entering the conduit 56 through the fluid conduit 31" in fluid communication with the supply conduit 38" flows through the conduit 56 on the first side of the inner shell 12' before continuing on the second side of the inner shell 12", ultimately leaving the conduit 56 on the second side of the inner shell 12" through the fluid conduit 31" in fluid communication with the exhaust conduit 40". As the vessel 10" has an elevated temperature during pressurization, the fluid leaving the vessel 10" in the exhaust conduit 40" has a higher temperature than the fluid entering the vessel 10" in the supply conduit 38". After entering the passive heat exchanger 62, heat in the fluid is transferred to the ambient environment and removed from the temperature control system 60. The fluid exits the passive heat exchanger 62 at a lower temperature and is recirculated by the pump 36". It should be noted that the vessel 10" including the conduit 56 may also be used with the temperature control system 32, 52. The temperature control system 32, 52, 60 may also be used to heat the vessel 10" in a similar manner.

The temperature control system 32, 52, 60 continues to operate in this manner until the temperature of the vessel 10, 10', 10" is lowered and detected by the temperature sensor 46, 46', 46", and operation of the pump 36, 36" or the blower 54 is stopped by the controller 44, 44', 44".

The temperature regulating device and the temperature control system 32, 52, 60 may also be configured to heat the vessel 10, 10', 10". During rapid depletion of the contents of the vessel 10, 10', 10" (such as when the vehicle requires swift acceleration or during servicing of the vessel 10, 10', 10"), the temperature regulating device and the temperature control system 32, 52, 60 cooperate to increase a temperature of the inner shell 12, 12', 12". Upon detection of a drop in temperature of the vessel 10, 10', 10" by the temperature sensor 46, 46', 46", the pump 36, 36" or the blower 54 is activated.

Increasing the temperature of the vessel 10, 10', 10" may also allow for a decreased manufacturing time of the vessel 10, 10', 10". To decrease the curing time of the outer shell 18, 18', 18" during manufacture of the vessel 10, 10', 10" a manufacturing temperature control system, similar to the temperature control system 32, 52, 60 may be used. Upon disposal of the outer shell 18, 18', 18" on the inner shell 12, 12', 12" and one of the porous layer 16, the plurality of channels 50, and the conduit 56, the manufacturing temperature control system is attached to the boss 14, 14', 14" in fluid communication with the fluid conduits 31, 31', 31".

The fluid in the temperature control system 32 and the porous layer 16 is circulated by the pump 36. The fluid entering the porous layer 16 through the fluid conduit 31 in fluid communication with the supply conduit 38 disperses through the pores of the porous layer 16, ultimately leaving the porous layer 16 through the fluid conduit 31 in fluid communication with the exhaust conduit 40. The fluid may be directed towards the fluid conduit 31 in fluid communication with the exhaust conduit 40 by the fluid barriers formed therein. As the outer shell 18 absorbs heat from the fluid, the curing time is reduced. Accordingly, the fluid leaving the vessel 10 in the exhaust conduit 40 has a lower temperature than the fluid entering the vessel 10 in the supply conduit 38. After entering the heat exchanger 42, heat in the second conduit is transferred to the fluid. The fluid exits the heat exchanger 42 at a higher temperature and is recirculated by the pump 36.

The fluid in the temperature control system 52 and the plurality of channels 50 is circulated by the blower 54. A heat source (not shown) may be placed adjacent the inlet 53 to heat the fluid entering therein. The fluid entering the plurality of channels through the fluid conduit 31' in fluid communication with the supply conduit 38' flows through each of the channels on the first side of the inner shell 12' along the outer surface 25', ultimately leaving the plurality of channels 50 on the second side of the inner shell 12' through the fluid conduit 31' in fluid communication with the exhaust conduit 40'. As the outer shell 18' absorbs heat from the fluid, the curing time is reduced. Accordingly, the fluid leaving the vessel 10' in the exhaust conduit 40' has a lower temperature than the fluid entering the vessel 10' in the supply conduit 38'.

The fluid in the temperature control system 60 and the conduit 56 is circulated by the pump 36". The fluid entering the conduit 56 through the fluid conduit 31" in fluid communication with the supply conduit 38" flows through the conduit 56 on the first side of the inner shell 12" before continuing on the second side of the inner shell 12", ultimately leaving the conduit 56 on the second side of the inner shell 12" through the fluid conduit 31" in fluid communication with the exhaust conduit 40". As the outer shell 18" absorbs heat from the fluid, the curing time is reduced. Accordingly, the fluid leaving the vessel 10" in the exhaust conduit 40" has a lower temperature than the fluid entering the vessel 10" in the supply conduit 38". After entering the passive heat exchanger 62, heat from the ambient environment is transferred to the fluid into the temperature control system 60. The fluid exits the passive heat exchanger 62 at a higher temperature and is recirculated by the pump 36".

The temperature control system 32, 52, 60 continues to operate in this manner for a predetermined amount of time or until the outer shell 18, 18', 18" is cured.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A vessel comprising:
    a hollow inner shell having an interior cavity adapted to store a first fluid;
    an outer shell formed around the hollow inner shell;
    a temperature regulating device at least one of disposed between the hollow inner shell and the outer shell, disposed in the hollow inner shell, and disposed in the outer shell; and
    a boss having a vessel opening formed therethrough and in communication with the interior cavity of the hollow inner shell, the boss including a first fluid conduit and a second fluid conduit formed therein between the vessel opening and an outer surface of the boss, the boss disposed on the inner shell and forming a substantially fluid tight seal therebetween, wherein the first fluid conduit, the second fluid conduit, and the temperature regulating device are in fluid communication with a temperature control system, and a second fluid received by the temperature regulating device through the first fluid conduit from the temperature control system is permitted to circulate in the temperature regulating device and return to the temperature control system through the second fluid conduit.

2. The vessel of claim 1, wherein the temperature regulating device is disposed between an outer surface of the hollow inner shell and an outer surface of the outer shell.

3. The vessel of claim 1, wherein the temperature regulating device is disposed between an inner surface of the hollow inner shell and an outer surface of the hollow inner shell.

4. The vessel of claim 1, wherein the temperature regulating device is disposed between an outer surface of the hollow inner shell and an inner surface of the outer shell.

5. The vessel of claim 1, wherein the temperature regulating device is formed from a porous layer.

6. The vessel of claim 1, wherein the temperature regulating device includes a plurality of channels formed in an outer surface of the hollow inner shell.

7. The vessel of claim 1, wherein the temperature regulating device includes a conduit disposed in a channel formed in an outer surface of the hollow inner shell.

8. The vessel of claim 1, wherein the temperature control system includes a liquid to liquid heat exchanger.

9. The vessel of claim 1, wherein the temperature control system includes a liquid to air heat exchanger.

10. The vessel of claim 1, wherein the temperature control system includes a conduit in fluid communication with an ambient environment.

11. The vessel of claim 1, wherein the temperature control system is in electrical communication with at least one temperature sensor.

12. The vessel of claim 1, wherein the outer shell is formed by a filament winding process.

13. The vessel of claim 1, wherein the hollow inner shell is formed by one of a rotational molding process and a blow molding process.

14. The vessel of claim 1, wherein the hollow inner shell is formed from one of a polymer and a non-metallic material.

15. A vessel comprising:
    a hollow inner shell having an interior cavity adapted to store a first fluid;
    an outer shell formed around the hollow inner shell;
    a temperature regulating device at least one of disposed between the hollow inner shell and the outer shell and disposed in the hollow inner shell;
    a boss having a vessel opening formed therethrough and in communication with the interior cavity of the hollow inner shell, the boss including a first fluid conduit and a second fluid conduit formed therein between the vessel opening and an outer surface of the boss, the boss disposed on the hollow inner shell and forming a substantially fluid tight seal therebetween; and
    a temperature control system in electrical communication with at least one temperature sensor, wherein the temperature regulating device, the first fluid conduit, and the second fluid conduit are in fluid communication with the temperature control system and form a closed loop system, and a second fluid received by the temperature regulating device through the first fluid conduit from the temperature control system is permitted to circulate in the temperature regulating device and return to the temperature control system through the second fluid conduit.

16. The vessel of claim 15, wherein the temperature regulating device comprises a porous layer.

17. The vessel of claim 15, wherein the temperature regulating device comprises a plurality of channels formed in an outer surface of the hollow inner shell.

18. The vessel of claim 15, wherein the temperature regulating device comprises a conduit disposed in a channel formed in an outer surface of the hollow inner shell.

19. The vessel of claim 15, wherein the temperature control system includes a liquid to liquid heat exchanger.

20. A vessel comprising:
    a hollow inner shell having an interior cavity adapted to store a first fluid;

a filament wound outer shell formed around the hollow inner shell;

a temperature regulating device including a porous layer disposed between the hollow inner shell and the outer shell;

a boss having a vessel opening formed therethrough and in communication with the interior cavity of the hollow inner shell, the boss including a first fluid conduit and a second fluid conduit formed therein between the vessel opening and an outer surface of the boss, the boss disposed on the hollow inner shell and forming a substantially fluid tight seal therebetween; and a temperature control system in electrical communication with at least one temperature sensor, wherein the first fluid conduit, the second fluid conduit, and the porous layer are in fluid communication with the temperature control system and form a closed loop system, and a second fluid received by the porous layer through the first fluid conduit from the temperature control system is permitted to circulate in the porous layer and return to the temperature control system through the second fluid conduit.

* * * * *